United States Patent [19]

Rumbolt et al.

[11] Patent Number: 4,774,511
[45] Date of Patent: Sep. 27, 1988

[54] UNIVERSAL REMOTE CONTROL UNIT

[75] Inventors: Robin B. Rumbolt; William R. McIntyre, Jr., both of Knoxville, Tenn.

[73] Assignee: NAP Consumer Electronics Corp., New York, N.Y.

[21] Appl. No.: 739,357

[22] Filed: May 30, 1985

[51] Int. Cl.⁴ .................................... H04Q 1/00
[52] U.S. Cl. ...................... 340/825.69; 358/194.1
[58] Field of Search ............ 358/194.1; 455/603; 340/365 VL, 365 S, 825.69, 825.72

[56] References Cited

U.S. PATENT DOCUMENTS

| | | | |
|---|---|---|---|
| 3,956,745 | 5/1976 | Ellis | 340/365 VL X |
| 4,045,777 | 8/1977 | Mierzwinski et al. | |
| 4,143,368 | 3/1979 | Route et al. | 455/603 X |
| 4,334,242 | 6/1982 | Mangold | |
| 4,335,374 | 6/1982 | Nyuji | 340/365 S |
| 4,337,480 | 6/1982 | Bourassin et al. | |
| 4,386,436 | 5/1983 | Kocher et al. | |
| 4,394,691 | 7/1983 | Amano et al. | |
| 4,412,218 | 10/1983 | Niitsu | 340/365 S X |
| 4,413,261 | 11/1983 | Greenberg | 340/825.72 |
| 4,431,988 | 2/1984 | Molusis et al. | 340/365 VL X |
| 4,454,501 | 6/1984 | Butts | 340/365 S X |
| 4,482,947 | 11/1984 | Zato et al. | |
| 4,488,179 | 12/1984 | Kruger et al. | |
| 4,514,732 | 4/1985 | Hayes, Jr. | |
| 4,519,002 | 5/1985 | Amano | |
| 4,527,204 | 7/1985 | Kozakai et al. | |
| 4,527,704 | 7/1985 | Swartzbaugh | |
| 4,529,980 | 7/1985 | Liotine et al. | |
| 4,566,034 | 1/1986 | Harger et al. | |
| 4,623,887 | 11/1986 | Welles, II | 340/825.72 X |

FOREIGN PATENT DOCUMENTS

3310580  9/1984  Fed. Rep. of Germany .
3313493  10/1984  Fed. Rep. of Germany .

Primary Examiner—Ulysses Weldon
Attorney, Agent, or Firm—Thomas A. Briody; Algy Tamoshunas; Marianne R. Rich

[57] ABSTRACT

The remote control unit has a selection mechanism for selecting any one of a number of categories of equipment to be controlled. The commands available for keyboard input in any given category are automatically displayed to the user upon selection of the category. Switches are provided for user selection of the model number of any one of a number of manufacturers of the equipment within the category to be controlled. Operation of the switches allows program controlled readouts of formats stored in memory. An infra-red LED is then energized in accordance with the format to transmit the signal to the unit to be controlled.

11 Claims, 6 Drawing Sheets

UNIVERSAL REMOTE CONTROL UNIT

FIELD OF THE INVENTION

The present invention relates to remote control units and, particularly, to remote control units for controlling home appliances to carry out selected operations.

BACKGROUND OF THE INVENTION

At present, many home appliances are available which can be remotely controlled by the user. For example, a television set can be turned on and off, a channel can be selected, a video cassette recorder controlled to play or record, etc. However, each manufacturer uses a different signal format to effect this control. Not only do different operations require different control signals, but the basic format, such as the bit timing, the number of bits per word, the width of the pulses, the modulating frequency, if any, applied to each pulse, the presence of, length of, and format of start, lead, or trailer pulses and the number of correct receptions of a particular command required to activate the appliance to carry out the selected operation varies from manufacturer to manufacturer. The basic format may also be different for different model numbers of the same manufacturer.

Many homes have appliances which can be remotely controlled, but which are manufactured by different manufacturers. Further, control of, for example, a video cassette recorder frequently requires the ability to control a related appliance, e.g. a television set, in conjunction therewith. At present, viewing a recorded program requires use of two individual remote control units, particularly if the recorder and the television set are not made by the same manufacturer.

SUMMARY OF THE INVENTION

It is an object of the present invention to furnish a universal remote control unit which allows control of different types of appliances as well as appliances manufactured by different manufacturers.

The remote control unit is to be simple to operate, light, reliable, and relatively inexpensive.

In accordance with the invention, the user selects a particular category of appliance and its model number and/or manufacturer. Selecting the category automatically causes a display of commands available in the category, again for user selection. After the relevant selections have been made, the selection elements are automatically scanned under control of a microprocessor and an address signal is generated. This address signal allows readout from a storage of a product code signifying the required parameters, i.e. frequency, pulse width, pulse repetition rate, word length, etc. and the application of product code signals signals to a formatter unit. The latter energizes a transmitter section which transmits signals corresponding thereto to the controlled appliance, thereby causing the appliance to execute the command selected by the user.

According to the invention, use of the remote control unit can further be facilitated by permanent association of operation command of one appliance with related operation commands of another. Thus, in a preferred embodiment, user selection of a VCR "play" command will automatically trigger the command switching the associated television set to the empty channel to be used for display, followed by the command setting the VCR to the "play" mode. This concept is referred to as command chaining herein.

In a further preferred embodiment, the user selectable operation commands for some appliance categories also automatically include commands associated with a related category. For example, television volume controls are available upon selection of the VCR category.

The present invention, as well as additional objects thereof, will be better understood upon reference to the following description taken in connection with the accompanying drawing.

DESCRIPTION OF THE PREFERRED EMBODIMENTS

Figure 1:
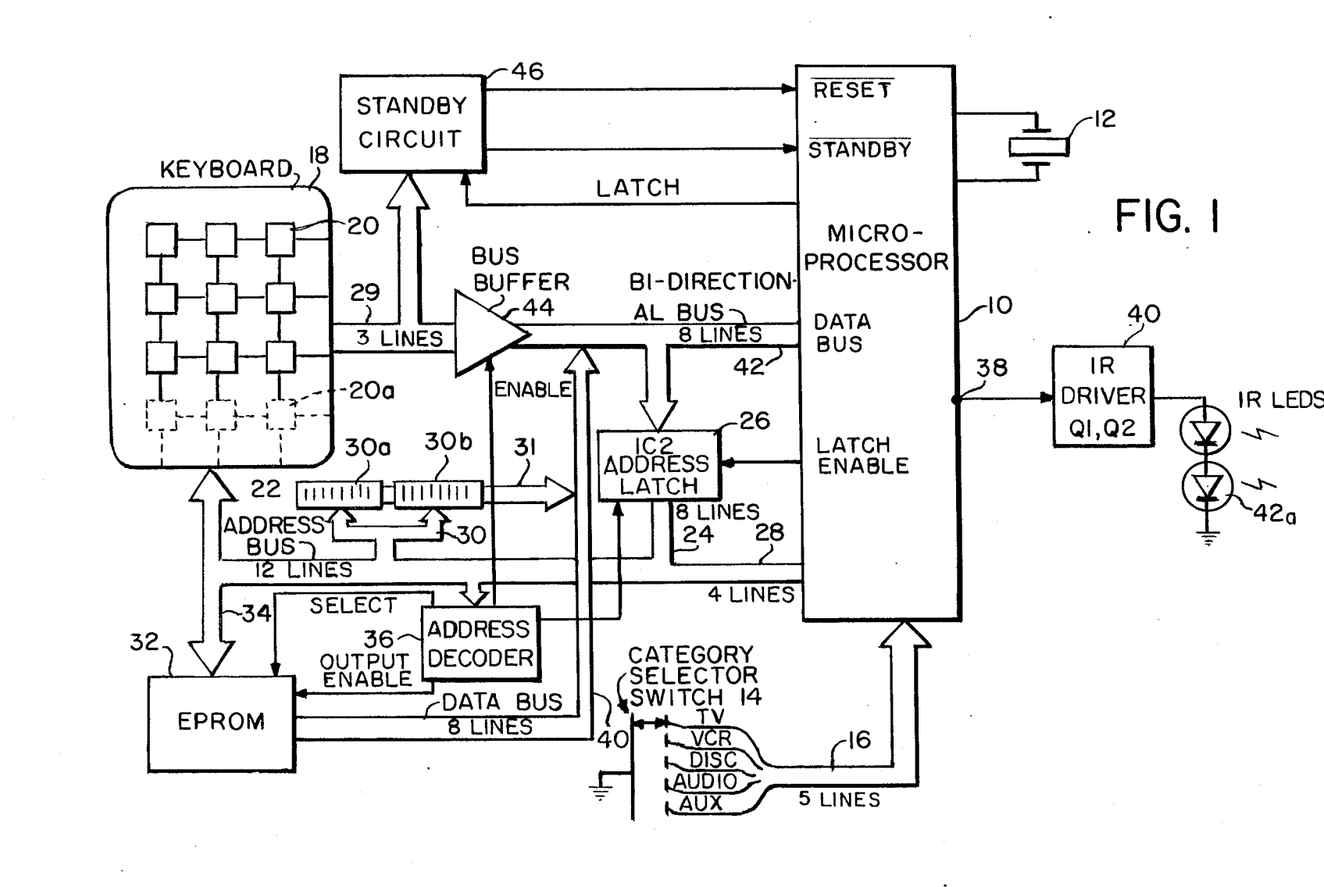
FIG. 1 is a block diagram of the remote control unit according to the present invention.

In the schematic diagram of FIG. 1, a microprocessor which is the central control unit for the system is denoted by reference numeral 10. The timing of microprocessor 10 is controlled by crystal time base 12. The basic microprocessor function is to receive data from three user-controlled selecting devices and to energize an infrared transmitting system to transmit signals with a format selected in accordance with this information. The transmitted infrared radiation is then received by the appliance and causes it to operate as desired by the user.

In the preferred embodiment, the microprocessor is Hitachi HD6301 operated in mode 6 with an oscillator frequency of 4 MHz and an instruction cycle time of 1 microsecond. This speed is necessary in order to generate the carrier output frequencies of up to 55 KHz required by some IR control systems.

The first of the user-operated selection devices is a category selector switch 14, by which the user selects the category of the appliance which is to be controlled. Its output is connected to microprocessor 10 through five lines 16. In the example illustrated in FIG. 1, the following categories are provided: a television receiver (TV), a video cassette recorder (VCR), a disc player (disc), an audio system (audio), and an auxiliary input (aux) suitable, for example, for controlling a cable converter.

Figure 4A:
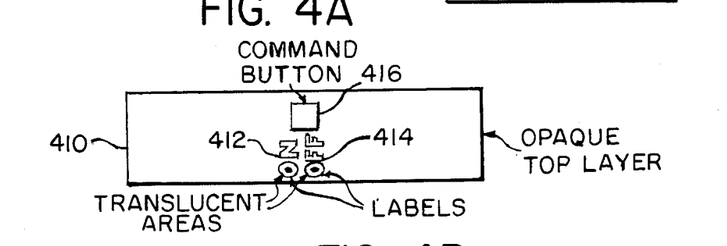
FIGS. 4A and 4B are schematic diagrams illustrating the keyboard mechanism of the present invention.
Figure 4B:
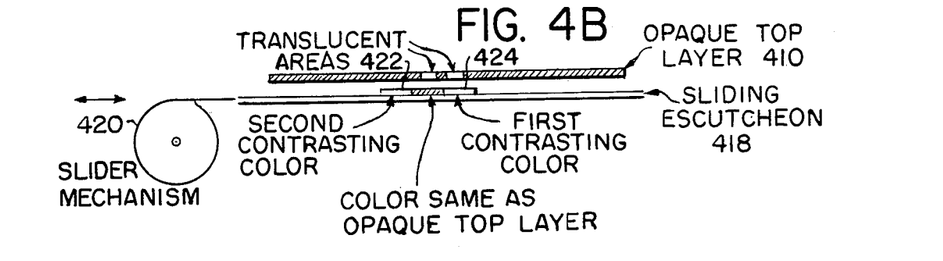

The second selection device is a keyboard 18. As will be described in greater detail with reference to FIG. 4, category selector switch 14 is mechanically coupled to an escutcheon slider which moves in conjunction with the movement of the category selection switch to "illuminate" legends indicating specific commands associated with the selected categories in display windows or areas 20. Additional areas indicated by dashed lines and designated by reference numbers 20a display operation commands available for controlling an appliance operationally associated with the appliance of the category selected by selector switch 14. For example, a television receiver is operationally associated with a video cassette recorder when the latter is in the "play" mode.

In the preferred embodiment, keyboard 18 is a 3×11 matrix, addressable by 11 address lines of a bus 22. Bus 22 is constituted by an eight line bus 24 activated by an address latch 26 and a four line bus 28 activated by microprocessor 10. Keyboard output is furnished on a three line bus 29.

Finally, two sets of dip switches, 30A and 30B, allow the user to identify the model number and/or manufacturer of the appliance to be controlled. The switches are addressed by a twelve line bus 30 also connected by buses 24 and 28.

Within each category, a number of appliance models is individually selectable in accordance with the following table which, however, is illustrative only:

TABLE I

| (1) | TV | up to | 64 formats | (6 dipswitches) |
|---|---|---|---|---|
| (2) | VCR | up to | 8 formats | (3 dipswitches) |
| (3) | DISC | up to | 4 formats | (2 dipswitches) |
| (4) | AUDIO | up to | 8 formats | (3 dipswitches) |
| (5) | AUX | up to | 4 formats | (2 dipswitches) |
| | | | 88 formats | 16 dipswitches |

Also shown in FIG. 1 is an electrically programmable read only memory (EPROM) 32. This memory contains look-up tables indexed by the category selector, the dipswitches, and the particular key pressed on the keyboard. Indexing takes place via addresses on a twelve line address bus 34 similar to bus 22. The data read out from the tables, including a product code and a command code, is then passed to the appropriate IR transmitter routine called a "formatter" also stored in EPROM 32. Each formatter is a device-specific program designed to generate the precise carrier frequency, pulse modulation and overall timing format required by the particular device. EPROM 32 is also controlled by an address decoder 36 through a "select" line 37 and an "output enable" line 39. The output of EPROM 32 is furnished on an eight line data bus 40 which connects to a bidirectional bus lines 42. Bus 42 interconnects microprocessor 10, address latch 26 and a tri-state buffer 44.

The input to address decoder 36 is a 4 bit address furnished by four lines from microprocessor 10. A latch enable line connects microprocessor 10 to address latch 26. Address decoder 36 also has an output connected via an "enable" line to buffer 44.

The data output lines from keyboard 18 are also connected to the inputs of a stand-by controller 46. A first and second output of stand-by controller 46 are connected to a reset and stand-by input of microprocessor 10, respectively.

Finally, an output port 38 of microprocessor 10 is connected to IR driver circuit 40 which in turn drives infrared light emitting diodes (LED's) 42a.

Address latch 26, when enabled, latches the address applied to it via bus 42 so that the latter may be used to transmit data to microprocessor 10.

Figure 2:
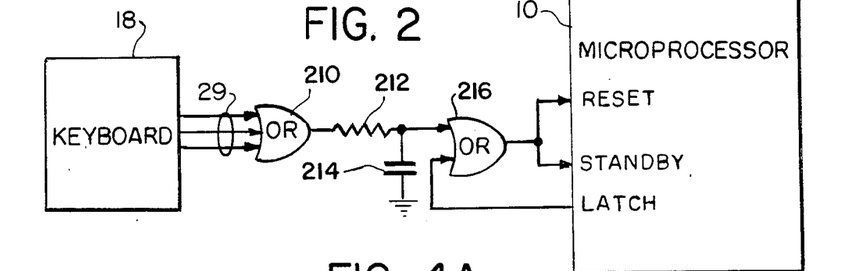
FIG. 2 is a schematic diagram of the stand-by circuit.

Stand-by circuit 46 is shown in greater detail in FIG. 2, wherein corresponding elements have the same reference numerals as in FIG. 1. Specifically, it consists of an OR gate 210 having a three line input from bus 29. A timing circuit consisting of a resistor 212 and a capacitor 214 is connected to the output of OR gate 210. The common point of resistor 212 and capacitor 214 is connected to one input of an OR gate 216 whose second input is connected to a latch output of microprocessor 10. The output of OR gate 216 is connected to the reset and stand-by terminals of microprocessor 10.

Operation of the above-described equipment will now be described with reference to the flow chart of FIGS. 3A–D.

Figure 3A:
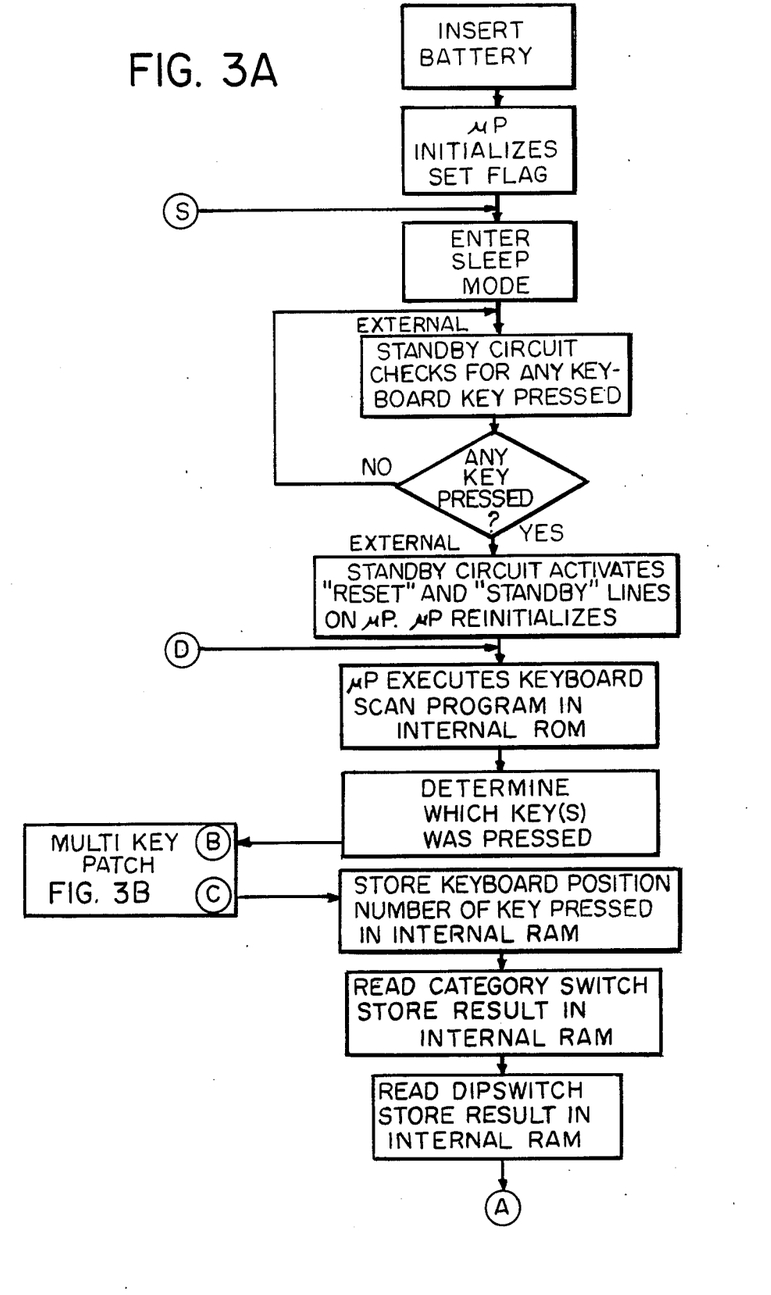
FIGS. 3A, 3B, 3C, 3D are flow charts for the microprocessor of FIG. 1.

Referring to FIG. 3A, upon insertion of the battery, microprocessor initialization takes place. A random access memory (RAM) in the microprocessor, the input-output ports, and a flag in the internal memory of the microprocessor are set to initial conditions. The microprocessor then enters the sleep mode. In this mode, stand-by circuit 46 grounds the reset and stand-by pins of the microprocessor. A circuit internal to the microprocessor shuts down all internal circuitry except for memory and the circuitry monitoring the "stand-by" and "reset" lines. This, state continues until a key of keyboard 18 is pressed.

Upon pressing of a key, OR circuit 210 receives an input, causing it to generate an output, charging capacitor 214. This, in turn, causes an output to appear at OR gate 216, energizing the "reset" and "stand-by" circuits in the microprocessor, and also energizing the output enable of latch 26. Monitoring of the stand-by and reset lines as well as the previously set flag causes the microprocessor to energize the latch for stand-by circuit 46 and to enable address latch 26.

The microprocessor then executes the keyboard scan. Specifically, the eleven rows of keyboard 18 and interrogated by bus 22 in a predetermined sequence. If a key on keyboard 18 is pressed, one of these rows is connected to its column, causing one of the lines of bus 29 to be at a high level at a specific step in the program. Buffer 44 is enabled by address decoder 36 to allow the information from keyboard 18 to be passed onto microprocessor 10.

Figure 3B:
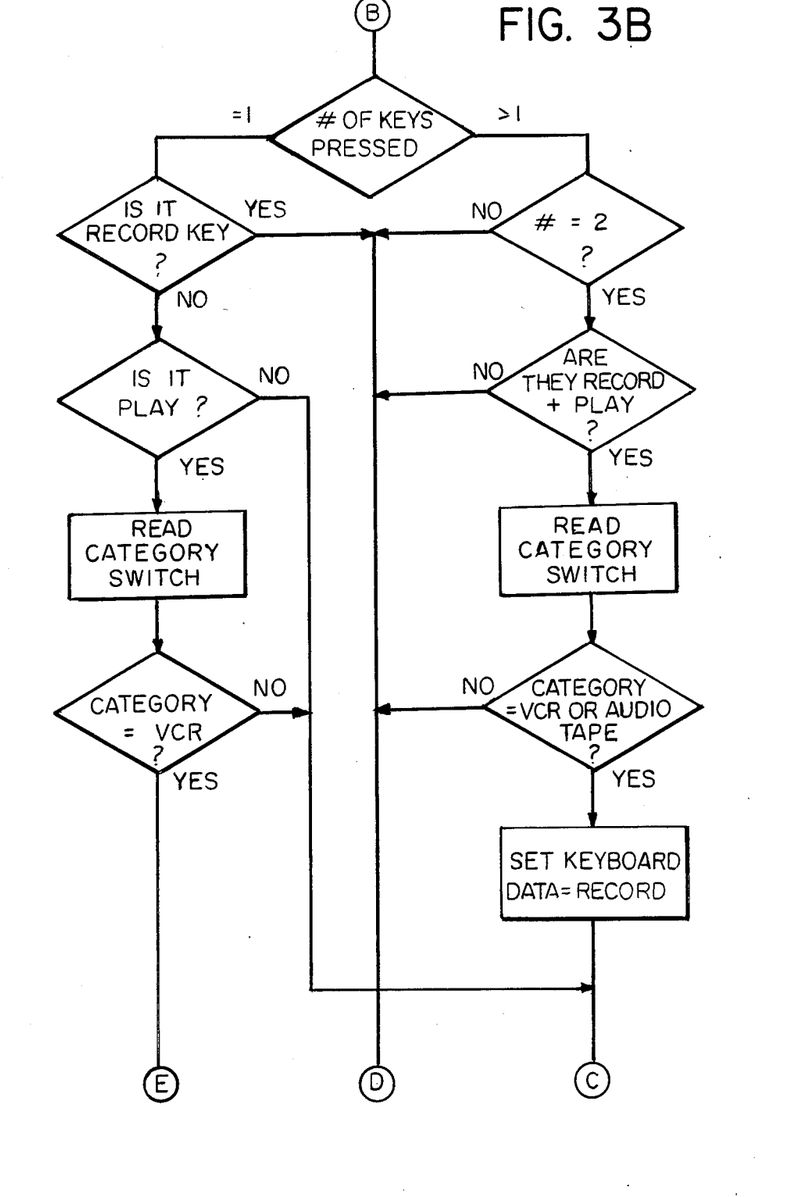

The microprocessor then enters the subroutine shown in FIG. 3B to determine which key (or keys) was pressed. Specifically, it is first determined whether the number of keys pressed is equal to 1 or greater than 1. If the number is greater than 1, it is determined whether the number is equal to 2. If the number is not equal to 2, i.e. if more than 2 keys have been pressed an unacceptable condition prevails and the program is aborted, a new scanning of the keyboard being initiated.

If two keys had been pressed, it is determined whether these are the record and play keys. It must be remembered that to activate the VCR to "record" both of these keys must be pressed. The category switch is then interrogated. This is an internal interrogation, since the outputs of switch 14 have been applied to the microprocessor. If the category is not either VCR or audio tape, the program is again aborted with resumption of keyboard scan. However, if the category switch does read either VCR or audio tape, the keyboard command is interpreted as a record command. Referring again to FIG. 3A, the keyboard position number of the pressed key is then stored in an an internal random access memor (RAM) in the microprocessor. On the other hand, if the number of keys pressed is equal to 1 and the so-pressed key is the record key, the program aborts as mentioned above. If it is not the record key and not the play key, the main program is resumed and the keyboard position number of the pressed key is stored in internal RAM. If it is the play key, the category switch is scanned. If the category is a category other than the VCR, the keyboard position number is again stored.

Figure 3C:
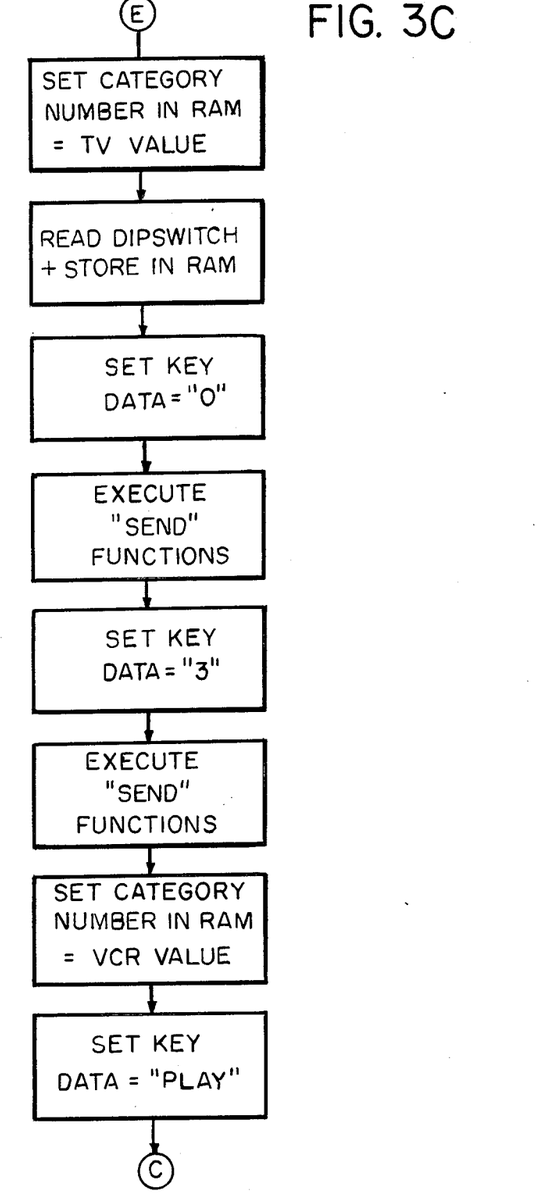

If, however, the category is VCR, the command chain illustrated in FIG. 3C commences. First, the category number in the RAM is set to the number signifying "television". The dipswitches are then scanned in the same manner as described previously with respect to the keyboard scan. Data readout on bus 31 is applied to the microprocessor through bus 42, latch 26 again carrying out its latching function. The dipswitch data is stored in RAM.

At this point, the microprocessor sends signals to the IR driver 40 causing it to send a command to the TV to switch it to the output channel of the VCR, e.g. channel 3. First, the key data in the RAM is set to zero. The "send" function is then executed. This is described in subroutine A, FIG. 3D, which will be discussed in detail below.

After the command "0" has been sent, the key data in the RAM is set to "3". The send function is again executed. At the end of this particular send operation, the television has been switched to channel 3.

At this point, the category number in RAM is set to the VCR value. The key data is set to "play".

The system then returns to the main program illustrated in FIG. 3A. The category switch is scanned and the result of the scan is stored in internal RAM. The scanning is controlled by a program in internal ROM. After the category switch data has been entered into RAM, the dipswitches are scanned, also under control of a program in internal ROM. The result of the scan is stored in the RAM of the microprocessor.

At this point, the microprocessor RAM contains data specifying the manufacture and model number of the device being controlled, the type of device it is and the key data, i.e. the data indicating the desired command.

Figure 3D:
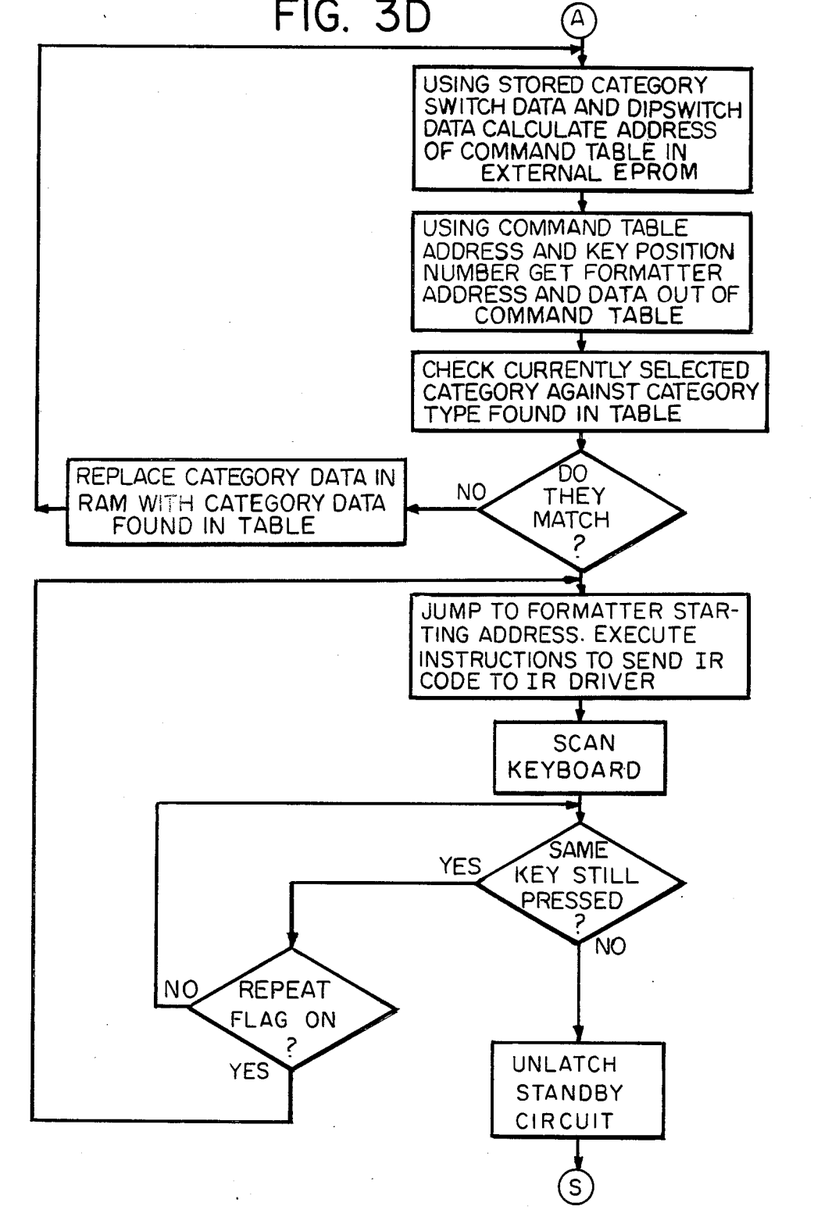

The program then goes into the "send" mode illustrated in FIG. 3D.

The program enters a "decode" routine located in internal ROM. The stored category switch data, key data and dipswitch data is used to calculate the address of the command table in EPROM 32. The command table stores the following data for each associated key:
1. the command word bit pattern;
2. the formatter starting address;
3. the associated category type; and
4. a repeating or nonrepeating flag, i.e. a flag signifying whether or not the command is to continue to be transmitted until the key is no longer depressed.

The category type found in the table is then checked against the currently selected category. A test is carried out whether they match. If not, the category data in RAM is replaced with the category data found in the table. For example, if the selected category is either disc or VCR, a TV command such as "volume up" will cause the "television" category to be stored in RAM.

If the two categories do match, the program jumps to the formatter starting address. The IR code is sent to the IR driver, i.e., the microprocessor acts in response to formatter instruction stored in EPROM 32 to send the proper carrier frequency, type of code, timing, etc. to the IR driver. The keyboard is then scanned again. If the key is no longer pressed, the stand-by circuit is unlatched. If the same key is still pressed, a test is carried out as to whether the repeat flag is on. If the repeat flag is not on, no code is output; however, keyboard scan continues until the key is released. If the repeat flag is not on, the program loops back to the formatter starting address so that the IR code continues to be sent to the IR driver.

It should be noted that after the stand-by circuit is unlatched by microprocessor 10, the timing circuit consisting of resistor 212 ahd capacitor 214 of FIG. 2 continues to hold the output of OR gate 216 high for a relatively short time since only a high impedance discharge path is available for the capacitor. Alternatively, latching and unlatcning of the microprocessor control could be dispensed with, a timing circuit being provided which maintains the microprocessor in stand-by for a time period adequate to assure that the command has been carried cut. For greater reliability, and because of the presence of chain commands, i.e. an automatic command sequence initiated for depression of a single button, a positive latch and unlatch by the microprocessor is preferable.

Referring now to FIGS. 4A and 4B, the construction of the keyboard-category selector switch combination will be described in detail. An opaque keyboard cover 410 has translucent areas 412, 414 formed in the shape of letters or labels. One or more label is associated with each button or key. In the illustration, the labels associated with a button 416 are "on" and "off". In operation, the keyboard cover is positioned parallel to and in close proximity of the sliding escutcheon 418. The slider mechanism which moves the escutcheon relative to the opaque top layer of the keyboard is operated by a thumb wheel 420. The sliding escutcheon carries a first and second contrasting color portion (422,424), i.e. contrasting to the color of the top layer, and, inbetween the two contrasting colors, a portion 426 which has the same color as the top layer. In the position illustrated, the first contrasting color is underneath the "off" label. This label would thus be "lit".

Thumbwheel mechanism 420 is activated by the user to select the category of appliance to be controlled, i.e. thumbwheel 420 controls the position of category selector switch 14 of FIG. 1. The same button can thus be used for different commands, depending upon the selected category. For example, pressing a given button may turn a VCR off, or turn a television set on.

Figure 5:
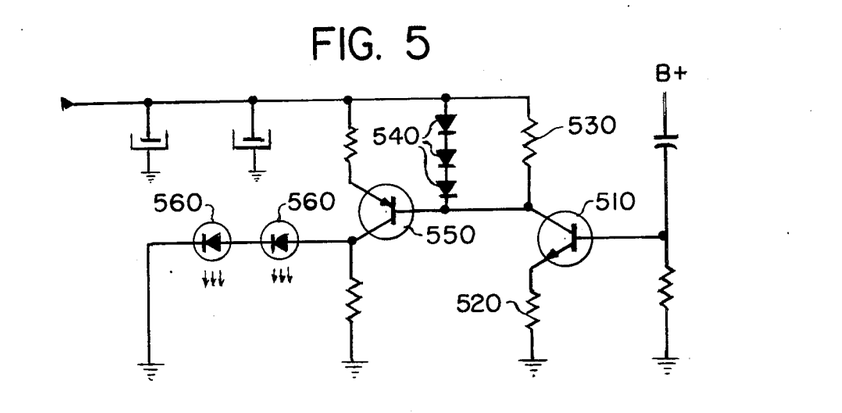
FIG. 5 is a schematic diagram of an infrared drive circuit.

The IR driver circuit illustrated in FIG. 5 is a standard driver circuit illustrated here for completeness only. It consists of a first amplifier stage including a transistor 510 having an emitter resistor 520 and a collector resistor 530. Three diodes 540 are connected in parallel with resistor 530. The collector of transistor 510 is connected to the base of a second transistor 550 connected as an emitter follower. Two light emitting diodes 560 are connected in the emitter circuit of transistor 550. The light emitting diodes emit infrared radiation under control of signals applied to the base circuit of transistor 510 by microprocessor 10.

Although the invention has been illustrated in a particular preferred embodiment, it is not intended to be limited thereto. Many variations in operation and construction will readily occur to one skilled in the art and are intended to be encompassed in the invention as set forth in the following claims.

We claim:
1. Unit for remotely controlling a plurality of appliances each belonging to a one of a plurality of appliance categories, each having a model number signifying a given model of a given manufacture, each adapted to carry out a predetermined function upon receipt of a remote control signal having a predetermined format, comprising:
    transmitter means for transmitting remote control signals having formats corresponding to formatted command signals applied thereto;

first user-operable selector means for generating a first selector signal signifying the selected one of said plurality of model numbers;

second user-operable selector means for generating a second selector signal signifying the user-selected one of said appliance categories;

command display and select means for displaying user selectable commands associated with the selected one of said appliance categories, and for generating a command signal signifying one of said commands in response to user's selection thereof;

means for generating an address signal in dependence on said first selector signal, said second selector signal and said command signal;

memory means storing a plurality of product and command tables in individually addressable storage locations;

and readout and formatting means for receiving said address signal and reading out product and command table data in said storage locations under control thereof, thereby creating read-out product and command data signals, formatting said command data signals in accordance with said product data signals, thereby creating said formatted command signals, and applying said formatted command signals to said transmitter means, whereby said transmitter means transmits a remote control signal having the correct format to control the user-selected appliance to perform the user-selected operation.

2. A remote control unit as set forth in claim 1, wherein said command display and select means comprises an array of command display elements, and third means operable in dependence upon operation of said second user-operable selector means for displaying commands associated with the user-selected appliance category in corresponding ones of said command display elements.

3. A remote control unit as set forth in claim 2, wherein said command display and select means is a keyboard having a plurality of keys and at least a first and second command respectively associated with a first and second one of said categories associated with at least one of said keys;

wherein said command display element associated with said at least one of said keys comprises a first and second symbol respectively signifying said first and second command positioned in proximity of said at least one of said keys;

wherein said third means comprises a slider carrying means for making said first or said second symbol legible depending on the relative position of said slider means to said symbols; and wherein said third means comprises means coupled to said second user of operable selector means for moving said slider means in correspondence to move of said second user-operable selector means.

4. A remote control unit as set forth in claim 3, wherein said second user-operable selector means comprises a rotary selector mechanism.

5. A remote control unit as set forth in claim 2, wherein said third means is mechanically coupled to said second user operable selector means.

6. A remote control unit as set forth in claim 1, wherein at least one additional command is associated with a predetermined one of said selected commands for transmission in a predetermined time relationship to the latter;

wherein said readout means is operative under control of program means; and wherein said program means automatically controls said readout means to read out command table data associated with said selected and said associated commands in said predetermined time relationship upon receipt of an address signal associated with said predetermined one of said commands.

7. A remote control unit as set forth in claim 6, wherein said at least one of said predetermined selected commands is a VCR play command and said associated command is a TV channel switch command generated prior to said VCR play command.

8. A remote control unit as set forth in claim 1, wherein said user-selectable commands further comprise commands associated with an additional appliance category operationally associated with said selected one of said appliance categories.

9. A remote control unit as set forth in claim 8, wherein said selected one of said appliance categories is the VCR category and said additional category is the television category, whereby user control of a television set can take place when said remote control unit is set for controlling a VCR.

10. Apparatus for remotely controlling any selected one of a first and second appliance respectively manufactured by a first and second manufacturer and respectively responsive to command signals having a first format and a second format different from said first format, comprising memory means for storing format-defining data for each of said appliances in addressable memory locations;

user controllable means for selectively addressing said memory locations and reading out said format-defining data stored therein;

user controllable command signal generating means for generating command signals signifying a desired operation of said appliance;

formatted signal generating means connected to said command signal generating means and said memory means for formatting said command signal in accordance with said read out format-defining data, thereby creating a formatted signal; and transmitting means connected to said formatted signalling generating means for transmitting said signals to said appliance to be controlled;

wherein operation of said first appliance in response to a first command requires transmission of a second command to said second appliance;

further comprising means responsive to said first command signal for automatically generating said second command signal, formatting said second command signal and said first command signal in accordance with read out format-defining data corresponding to said second and first appliance, respectively, and means for applying the so-formatted first and second command signals to said transmitting means in a predetermined sequence for transmission to said first and second appliance, respectivley.

11. A remote control unit as set forth in claim 10, wherein said first appliance is a video cassette recorder and said second appliance is a television receiver;

wherein said first command is a "play" command and said second command is a "switch to predetermined channel" command; and wherein said transmitting means to transmit said second command prior to transmission of said first command.

* * * * *